United States Patent
Trzmiel et al.

[11] Patent Number: 5,117,786
[45] Date of Patent: Jun. 2, 1992

[54] CHAIN TENSIONER FOR AN INTERNAL-COMBUSTION ENGINE

[75] Inventors: Alfred Trzmiel, Grafenberg; Matthias Kroener, Denkendorf; Johannes Weyandt, Illigen, all of Fed. Rep. of Germany

[73] Assignees: Dr. Ing. h.c.F. Porsche AG; Hydraulik-Ring GmbH, both of Fed. Rep. of Germany; a part interest

[21] Appl. No.: 666,674

[22] Filed: Mar. 4, 1991

[30] Foreign Application Priority Data

Jul. 26, 1990 [DE] Fed. Rep. of Germany ....... 4023728

[51] Int. Cl.⁵ ..................... F01L 1/04; F02B 67/06; F16H 7/08
[52] U.S. Cl. ................. 123/90.31; 474/110; 474/111
[58] Field of Search ............ 123/90.31; 474/110, 474/111, 117, 138

[56] References Cited

U.S. PATENT DOCUMENTS

| 4,190,025 | 2/1980 | Wahl | 474/110 |
| 4,458,403 | 7/1984 | Foster | 474/110 |
| 4,741,299 | 5/1988 | Matsuura et al. | 123/90.31 |
| 4,826,470 | 5/1989 | Breon et al. | 474/110 |
| 4,881,927 | 11/1989 | Suzuki | 474/111 |
| 4,889,087 | 12/1989 | Bergsten | 123/90.31 |

FOREIGN PATENT DOCUMENTS

| 3145115 | 12/1983 | Fed. Rep. of Germany . | |
| 3318093 | 11/1984 | Fed. Rep. of Germany | 123/90.31 |
| 3832512 | 4/1990 | Fed. Rep. of Germany | 474/110 |
| 985385 | 5/1949 | France | 123/90.31 |
| 150405 | 8/1985 | Japan | 123/90.31 |

Primary Examiner—Tony M. Argenbright
Assistant Examiner—Weilun Lo
Attorney, Agent, or Firm—Evenson, Wands, Edwards, Lenahan & Mckeown

[57] ABSTRACT

A chain tensioner for an internal-combustion engine comprises a hydraulic piston which is longitudinally guided in a housing bore and on which a tensioning shoe is placed on one side and which, from the direction of the other side, is pressed against the chain by a coil spring. For the damping of chain thrashing, the hydraulic piston is acted upon by hydraulic pressure in the tensioning direction as well as in the opposite direction.

12 Claims, 3 Drawing Sheets

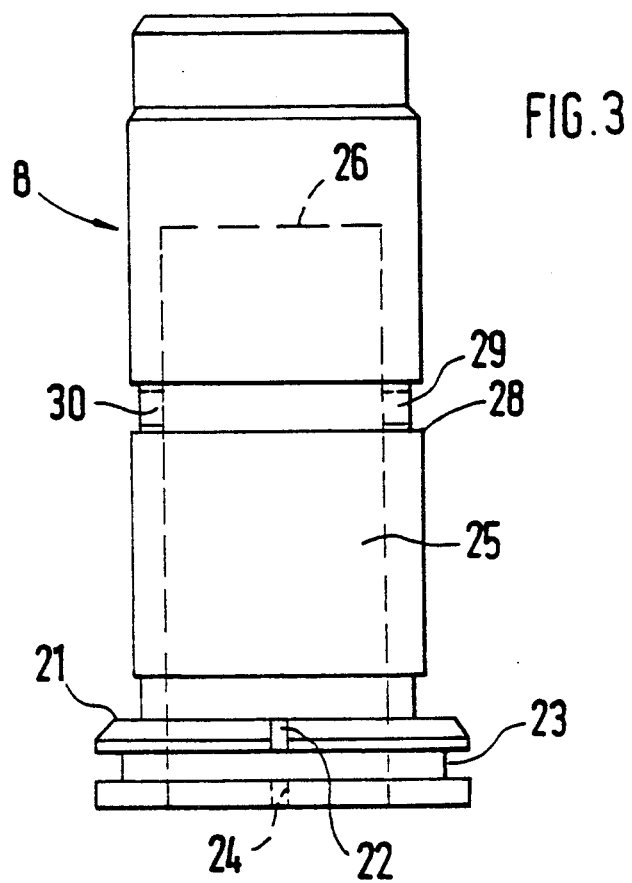

5,117,786

CHAIN TENSIONER FOR AN INTERNAL-COMBUSTION ENGINE

CROSS-REFERENCE TO CO-PENDING APPLICATION

This application cross-references co-pending application Ser. No. 07/663,670, filed Mar. 4, 1991, in the names of Alfred Trzmiel, et al.

BACKGROUND AND SUMMARY OF THE INVENTION

The present invention relates to a chain tensioner for an internal-combustion (IC) engine having a hydraulic piston which is longitudinally guided in a housing bore of a stationary housing and, on one side, is equipped with a tensioning shoe resting against a drive such as a chain or belt, and, on the other side, is loaded by a coil spring supported on the housing.

A chain tensioner described in German DE-PS 31 45 115 has a hollow piston longitudinally guided in a housing bore of a hydraulic housing. A tensioning shoe is placed on the top of the hydraulic piston. When the hollow piston is acted upon on its bottom side by hydraulic pressure, the chain is tensioned by the tensioning shoe. The hydraulic fluid is fed into the hollow piston via a ball check valve. When the hydraulic piston is loaded by chain thrashing, the hydraulic piston has the effect of a rigid body because the hydraulic fluid is almost incompressible, and the check valve prevents fluid from escaping. An excessive positive pressure is prevented by the opening of a relief valve. In addition to being acted upon by pressure, the hydraulic piston is acted upon by a coil spring on its bottom side.

It is an object of the present invention to provide a chain tensioner such that, when loaded by an impact, the hydraulic piston has higher flexibility and prevents a swinging and thrashing of the drive more effectively.

The foregoing object has been achieved in accordance with the present invention by using only a coil spring for tensioning the drive, e.g. a chain, with the hydraulic pressure controlling a hydraulic piston from both sides such that the piston is damped in both moving directions. The hydraulic piston is mechanically braced by a compression spring, and the hydraulic fluid acting upon it can escape when the chain is loaded by jolts. Thus, an excellent elastically damped chain tensioning is implemented.

Another advantage of the present invention is higher operational reliability. Conventional hydraulic chain tensioners are not fully operative during engine start if the hydraulic pressure has fallen after a prolonged stoppage of the internal-combustion engine and must first build up again after the start. Since the chain tensioner according to the present invention is tensioned mechanically, it is fully operative also during the start.

BRIEF DESCRIPTION OF THE DRAWINGS

These and other objects, features and advantages of the present invention will become more apparent from the following detailed description of a preferred embodiment when taken in conjunction with the accompanying drawings wherein:

FIG. 3 is a lateral view of the hydraulic piston of the chain tensioner.

DETAILED DESCRIPTION OF THE DRAWINGS

Figure 1:
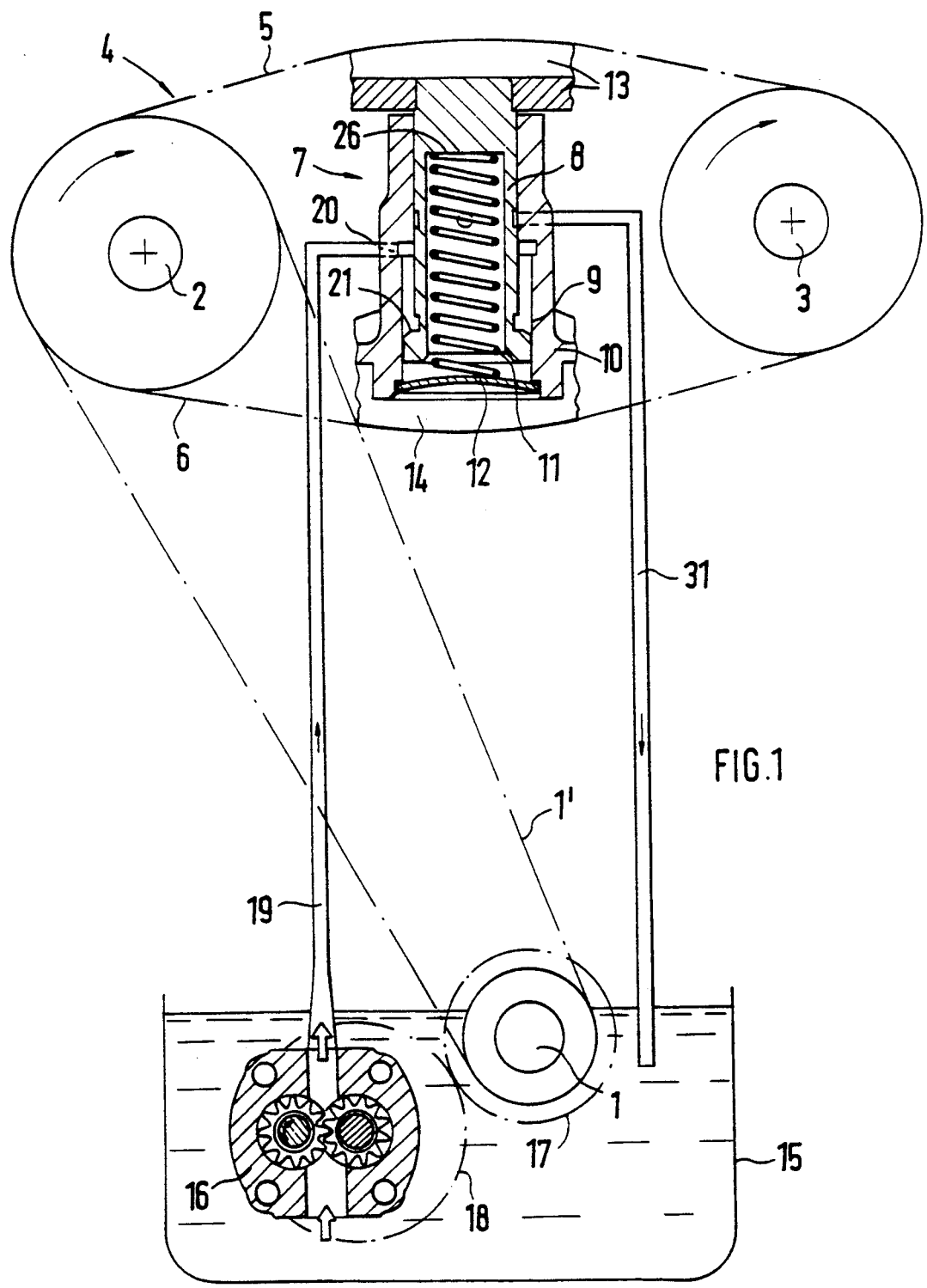
FIG. 1 is an elevational view of a camshaft drive with a chain tensioner.

A crankshaft 1 of an internal-combustion (IC) engine, by way of a toothed belt or a chain 1', drives an outlet camshaft 2 actuating outlet valves. By way of a chain designated by the numeral 4, the outlet camshaft 2 drives an inlet camshaft 3 controlling inlet valves. A hydraulically damped chain tensioner designated generally by the numeral 7 is applied to the load end 5 and the loose end 6 of the chain 4 from the direction of the interior side of the chain.

The chain tensioner 7 comprises a hollow hydraulic piston 8 which is longitudinally guided in a housing bore 9 of a stationary housing 10 and is braced with respect to the housing 10 by a centrally disposed coil spring 11. The coil spring 11 is supported on a disk 12 fastened in the housing 10. On the front side, a tensioning shoe 13 is fitted onto the hydraulic piston 8 and is pressed by the coil spring 11 against the load end 5 of the chain 4 to hold it under tension. A guide shoe 14 is fastened to the housing 10 and rests against the loose end 6 of the chain 4.

Figure 2:
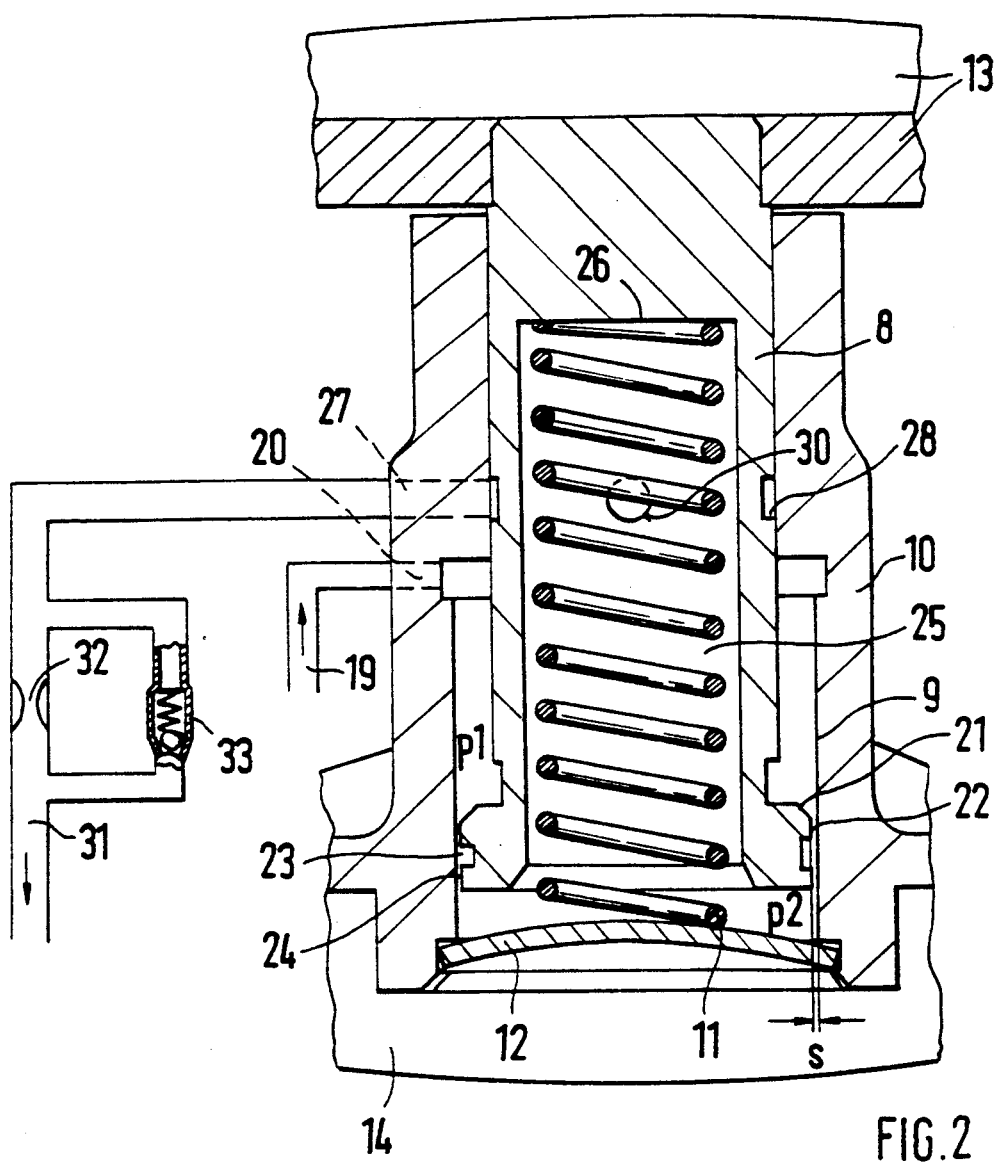
FIG. 2 is an enlarged longitudinal sectional view of the chain tensioner of FIG. 1.

In addition, hydraulic pressure is supplied to the hydraulic piston 8 from the direction of both sides for the damping purposes. Engine oil from an oil pan 15 of the internal-combustion engine is used as the hydraulic fluid. A gear pump 16 is arranged in the oil pan 15 and is driven by the crankshaft 1 via a pair of toothed wheels 17, 18. The gear pump 16 conveys the engine oil used as the hydraulic fluid by way of a pressure line 19 to the radial feeding duct 20 of the housing 10 and, from there, against the outer ring surface of the hydraulic piston 8. The outer ring surface 21 is connected fluid-guidingly with the interior surface 26 by way of the one or more throttle gaps in the form of a groove with a depth s. The engine oil reaches a ring groove 23 through a first axial groove 22 (FIG. 2), and then through a second axial groove 24, arrives in the cylindrical central hollow space 25 of the hydraulic piston 8 which is bounded by an interior surface 26. Because of the throttling in the axial grooves 22, 24, which are offset with respect to one another by 180°, the supplied hydraulic pressure P1 is reduced to a lower pressure P2 which affects the interior surface 26.

Close to the feeding duct 20, the housing 10 contains a return flow connection 27 which, by way of a ring groove 28 of the hydraulic piston 8, is connected with the return flow bores 29, 30 leading to the hollow space 25. A return flow line 31 is connected to the return flow connection 27, a throttle 32 being inserted into the return flow line 31 and a check valve 33 being inserted in the bypass with respect to it.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A chain tensioner for an internal-combustion engine, comprising a stationary housing and a hydraulic piston longitudinally guided in a housing bore of the stationary housing, which housing bore is substantially free of communication with outside air, wherein, one side of the piston is equipped with a tensioning shoe resting against a chain to be tensioned and the other side of the piston is loaded by a coil spring supported on the housing, wherein only the coil spring is arranged for tensioning of the chain, and hydraulic pressures of different magnitudes control the hydraulic piston from both sides thereof such that the hydraulic piston is damped in both moving directions solely by internal hydraulic friction by a first hydraulic pressure acting upon the piston in one of the moving directions and a second hydraulic pressure of lesser magnitude than the first hydraulic pressure acting upon the piston in the other of the moving directions.

2. The chain tensioner according to claim 1, wherein the first hydraulic pressure acts upon an outer ring surface of the hydraulic piston in the one moving direction, and the second hydraulic pressure of lesser magnitude than the first hydraulic pressure acts upon a central interior surface of the hydraulic piston in the other moving direction.

3. The chain tensioner according to claim 2, wherein the outer ring surface, by way of at least one throttle gap, is operatively connected in a fluid-guiding manner with the central interior surface.

4. The chain tensioner according to claim 2, wherein the hydraulic piston has a cylindrical hollow space bounded by the interior surface and contains the coil spring braced between the interior surface and the housing.

5. The chain tensioner according to claim 4, wherein a first axial groove communicates with a ring groove of the hydraulic piston from the ring surface, and the ring groove is connected to the hollow space, by way of a second axial groove.

6. The chain tensioner according to claim 5, wherein the first axial groove is offset by 180° in a circumferential direction with respect to the second axial groove.

7. The chain tensioner according to claim 4, wherein the hollow space, by way of radial return flow bores of the hydraulic piston and a ring groove, is connected with a return flow connection from which a return flow line leads to an oil pan of the internal-combustion engine.

8. The chain tensioner according to claim 7, wherein a first axial groove communicates with a ring groove of the hydraulic piston from the ring surface, and the ring groove is connected to the hollow space, by way of a second axial groove.

9. The chain tensioner according to claim 8, wherein the first axial groove is offset by 180° in a circumferential direction with respect to the second axial groove.

10. The chain tensioner according to claim 7, wherein the return flow line comprises a throttle and a check valve disposed in a bypass with respect to the return flow line.

11. The chain tensioner according to claim 8, wherein by way of appropriate dimensioning and arrangement of the axial grooves and of the throttle and the check valve, the hydraulic piston, during tensioning movement, is less extensively damped in the direction of the chain than in a direction opposite to the chain.

12. The chain tensioner according to claim 11, wherein the return flow line comprises a throttle and a check valve disposed in a bypass with respect to the return flow line.

* * * * *